United States Patent
Sadiq et al.

(10) Patent No.: US 11,601,911 B2
(45) Date of Patent: Mar. 7, 2023

(54) DETERMINING TIMING RESOLUTION AND RANGE OF REPORTED TIMING MEASUREMENTS USED FOR POSITION ESTIMATION

(71) Applicant: QUALCOMM Incorporated, San Diego, CA (US)

(72) Inventors: Bilal Sadiq, Basking Ridge, NJ (US); Muhammad Nazmul Islam, Littleton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/418,966

(22) Filed: May 21, 2019

(65) Prior Publication Data

US 2019/0364536 A1 Nov. 28, 2019

Related U.S. Application Data

(60) Provisional application No. 62/676,902, filed on May 25, 2018.

(51) Int. Cl.
*H04W 64/00* (2009.01)
*G01S 5/10* (2006.01)
(Continued)

(52) U.S. Cl.
CPC ......... *H04W 64/003* (2013.01); *G01S 5/0218* (2020.05); *G01S 5/10* (2013.01); *G01S 11/08* (2013.01)

(58) Field of Classification Search
CPC ... H04W 24/10; H04W 64/00; H04W 64/003; G01S 13/878; G01S 5/0036; G01S 5/10; G01S 11/08
See application file for complete search history.

(56) References Cited

U.S. PATENT DOCUMENTS 5,991,454 A * 11/1999 Fowler ................ G01S 7/02
382/251
2011/0158164 A1* 6/2011 Palanki ............ H04W 56/0015
370/328

(Continued)

FOREIGN PATENT DOCUMENTS

KR 20170134116 A 12/2017

OTHER PUBLICATIONS

International Search Report and Written Opinion—PCT/US2019/033536—ISA/EPO—dated Aug. 14, 2019.

*Primary Examiner* — Umair Ahsan
(74) *Attorney, Agent, or Firm* — Thien T. Nguyen

(57) ABSTRACT

Disclosed are techniques for determining a timing resolution and a range of reported timing measurements used for position estimation. For example, in various embodiments, a user equipment (UE) may receive positioning beacons from multiple network nodes (e.g., different base stations, distant transmission points belonging to one base station, etc.), measure an observed time difference of arrival (OTDOA) between the received positioning beacons, and quantize the measured OTDOA according to a timing resolution and/or a range that depend at least in part on one or more signal parameters associated with the received positioning beacons. Accordingly, the UE may then transmit a report containing the quantized OTDOA to a network entity, which may correspond to one or more of the network nodes from which the positioning beacons were received (e.g., a serving base station) or a location server.

30 Claims, 8 Drawing Sheets

(51) Int. Cl.
G01S 11/08 (2006.01)
G01S 5/02 (2010.01)

(56) References Cited

U.S. PATENT DOCUMENTS

| | | | | |
|---|---|---|---|---|
| 2018/0124733 | A1* | 5/2018 | Vilaipornsawai | H04W 76/27 |
| 2018/0302873 | A1* | 10/2018 | Kazmi | H04W 64/00 |
| 2019/0075543 | A1* | 3/2019 | Kim | H04W 64/006 |
| 2019/0104431 | A1* | 4/2019 | Gunnarsson | H04W 64/00 |

* cited by examiner

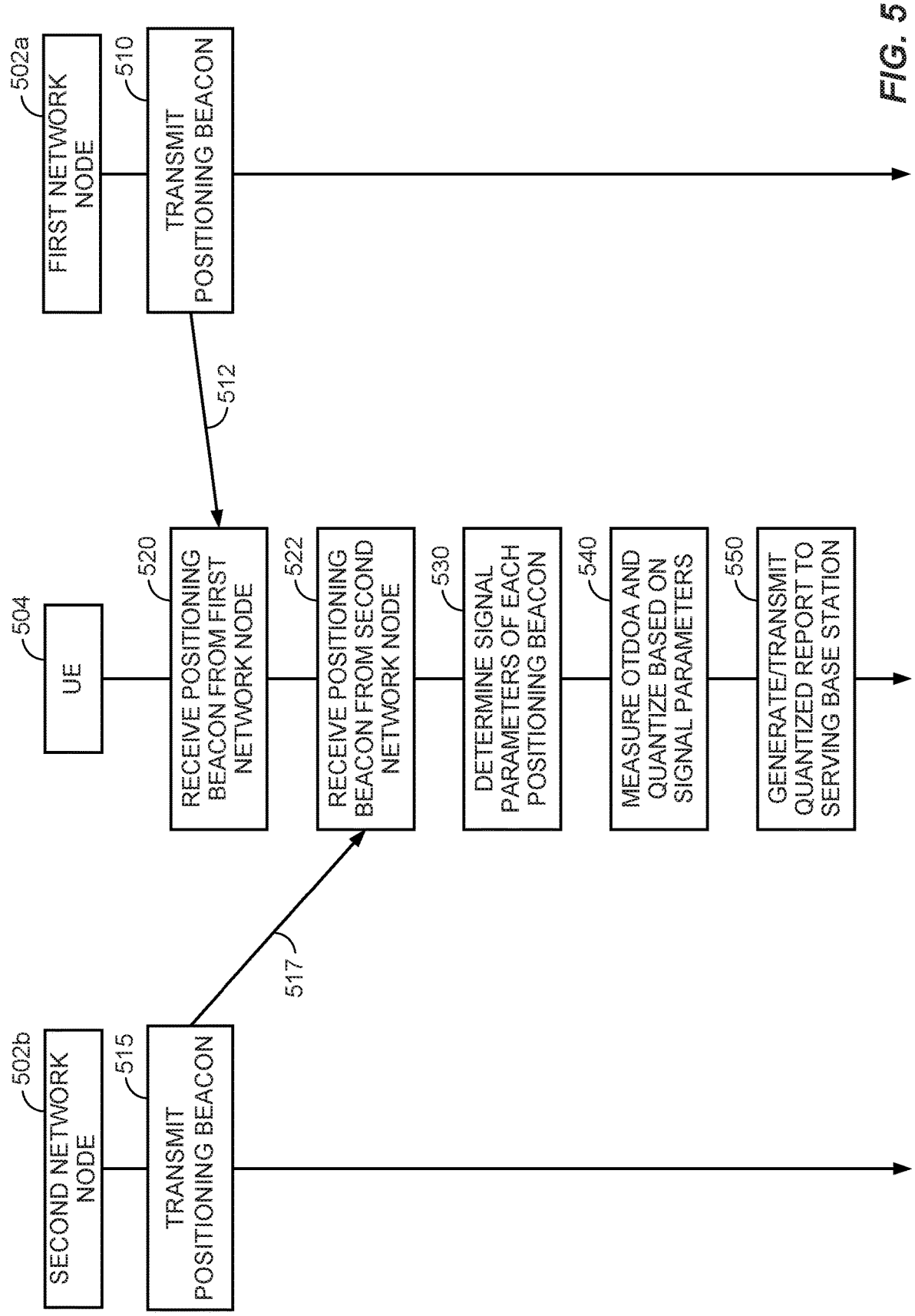

DETERMINING TIMING RESOLUTION AND RANGE OF REPORTED TIMING MEASUREMENTS USED FOR POSITION ESTIMATION

CROSS-REFERENCE TO RELATED APPLICATION

The present application for patent claims priority to U.S. Provisional Patent Application No. 62/676,902, entitled "DETERMINING TIMING RESOLUTION AND RANGE OF REPORTED TIMING MEASUREMENTS USED FOR POSITION ESTIMATION," filed May 25, 2018, assigned to the assignee hereof, and expressly incorporated herein by reference in its entirety.

TECHNICAL FIELD

Various aspects described herein generally relate to wireless communication systems, and more particularly, to determining a timing resolution and a range of reported timing measurements used for position estimation.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station).

Where a transmitter uses beamforming to transmit RF signals, the beams of interest for data communication between the transmitter and receiver will be the beams carrying RF signals having the highest received signal strength (or highest received Signal to Noise plus Interference Ratio (SINR), for example, in the presence of a directional interfering signal). However, the receiver's ability to perform certain tasks may suffer when the receiver relies upon the beam with the highest received signal strength. For example, in a scenario where the beam with the highest received signal strength travels over a non-LOS (NLOS) path that is longer than the shortest path (i.e., a LOS path or a shortest NLOS path), the RF signals may arrive later than RF signal(s) received over the shortest path due to propagation delay. Accordingly, if the receiver is performing a task that requires precise timing measurements and the beam with the highest received signal strength is affected by longer propagation delay, then the beam with the highest received signal strength may not be optimal for the task at hand.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

According to various aspects, a method for determining a timing resolution and range of reported timing measurements used for position estimation may comprise receiving positioning beacons from multiple network nodes at a user equipment (UE), measuring an observed time difference of arrival (OTDOA) between the received positioning beacons, quantizing the measured OTDOA according to a timing resolution and/or a range that depend at least in part on one or more signal parameters associated with the received positioning beacons, and transmitting a report containing the quantized OTDOA to a network entity.

According to various aspects, an apparatus may comprise a receiver configured to receive positioning beacons from multiple network nodes, wherein the received positioning beacons may include at least a first positioning beacon received from a first network node and a second positioning beacon received from a second network node, one or more processors configured to measure an OTDOA between the first positioning beacon and the second positioning beacon and to quantize the measured OTDOA according to a timing resolution and/or a range that depend at least in part on one or more signal parameters associated with the received positioning beacons, and a transmitter configured to transmit a report containing the quantized OTDOA to a network entity.

According to various aspects, an apparatus may comprise means for receiving positioning beacons from multiple network nodes, wherein the received positioning beacons may include at least a first positioning beacon received from a first network node and a second positioning beacon received from a second network node, means for measuring an OTDOA between the first positioning beacon and the second positioning beacon, means for quantizing the measured OTDOA according to a timing resolution and/or a range that depend at least in part on one or more signal parameters associated with the received positioning beacons, and means for transmitting a report containing the quantized OTDOA to a network entity.

According to various aspects, a non-transitory computer-readable storage medium may have computer-executable instructions recorded thereon, wherein the computer-executable instructions may be configured to cause a device having one or more processors to receive positioning beacons from multiple network nodes, wherein the received positioning beacons may include at least a first positioning beacon received from a first network node and a second positioning beacon received from a second network node, measure an OTDOA between the first positioning beacon and the second positioning beacon, quantize the measured OTDOA according to a timing resolution and/or a range that depend at least in part on one or more signal parameters associated with the received positioning beacons, and transmit a report containing the quantized OTDOA to a network entity.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which:

FIGS. 5-6 illustrate exemplary methods for determining a timing resolution and a range of reported timing measurements used for position estimation, according to various aspects of the disclosure.

DETAILED DESCRIPTION

Figure 1:
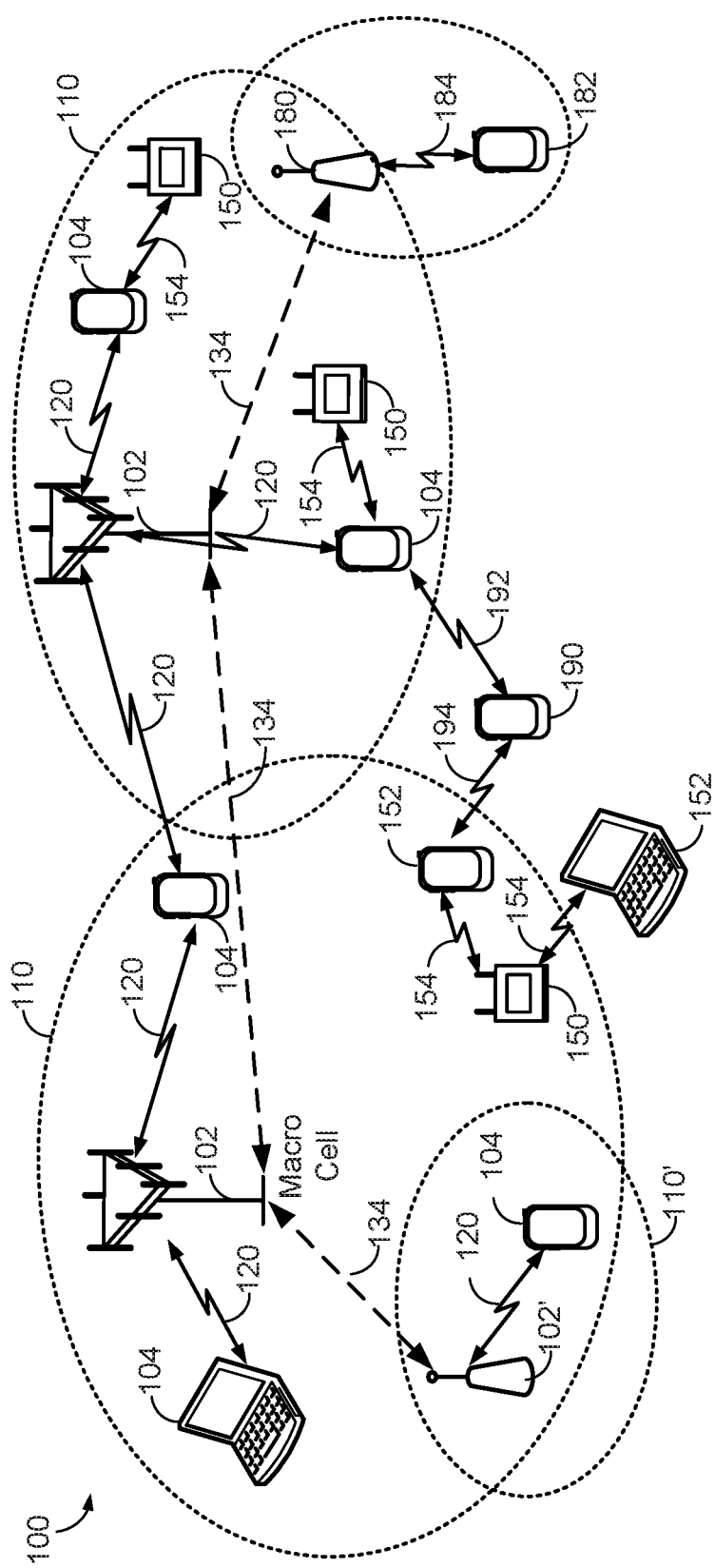
FIG. 1 illustrates an exemplary wireless communications system, according to various aspects of the disclosure.

Various aspects described herein generally relate to wireless communication systems, and more particularly, to determining a timing resolution and a range of reported timing measurements used for position estimation. For example, in one aspect, a method for determining the timing resolution and range of reported timing measurements used for position estimation may comprise receiving positioning beacons from multiple network nodes at a user equipment (UE), measuring an observed time difference of arrival (OTDOA) between the received positioning beacons, quantizing the measured OTDOA according to a timing resolution and/or a range that depend at least in part on one or more signal parameters associated with the received positioning beacons, and transmitting a report containing the quantized OTDOA to a network entity, which may correspond to one or more of the multiple network nodes from which the positioning beacons were received (e.g., a serving base station) or a location server.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include one or more wireless local area network (WLAN) access point (AP) 150 in communication with WLAN stations (STAs) 152 and/or UEs 104 via communication links 154 in an unlicensed frequency spectrum (e.g., 2.4 GHz, 5 GHz, 6 GHz, etc.). When communicating in an unlicensed frequency spectrum, the WLAN STAs 152 and/or the WLAN AP 150 may perform a clear channel assessment (CCA) prior to communicating in order to determine whether the channel is available. It will be appreciated that the one or more WLAN APs 150 may communicate with WLAN STAs 152 and/or UEs 104 according to one or more IEEE 802.11 standards as is known in the art.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with one of the WLAN STAs 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
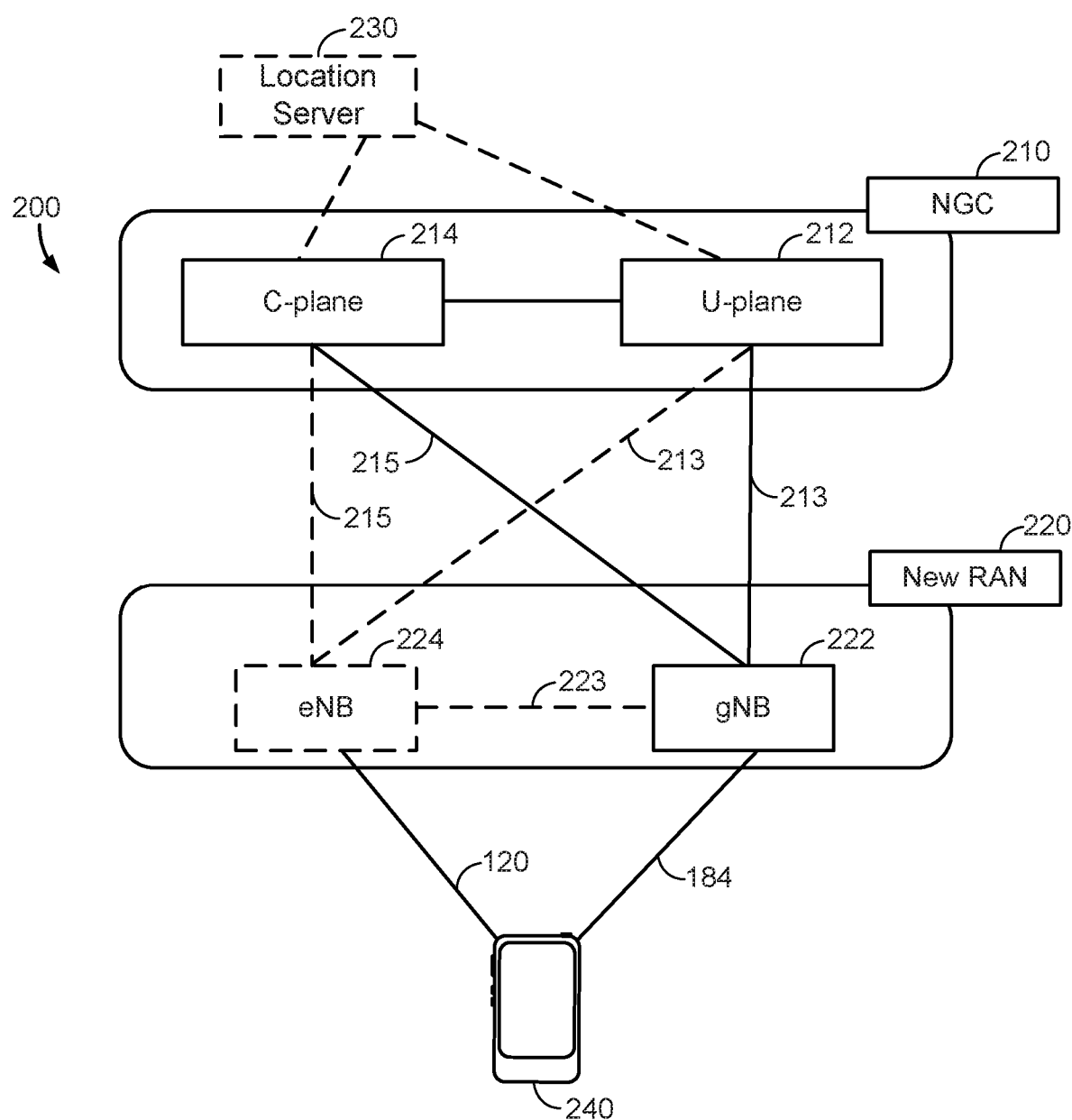
FIGS. 2A-2B illustrate example wireless network structures, according to various aspects of the disclosure.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include location server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
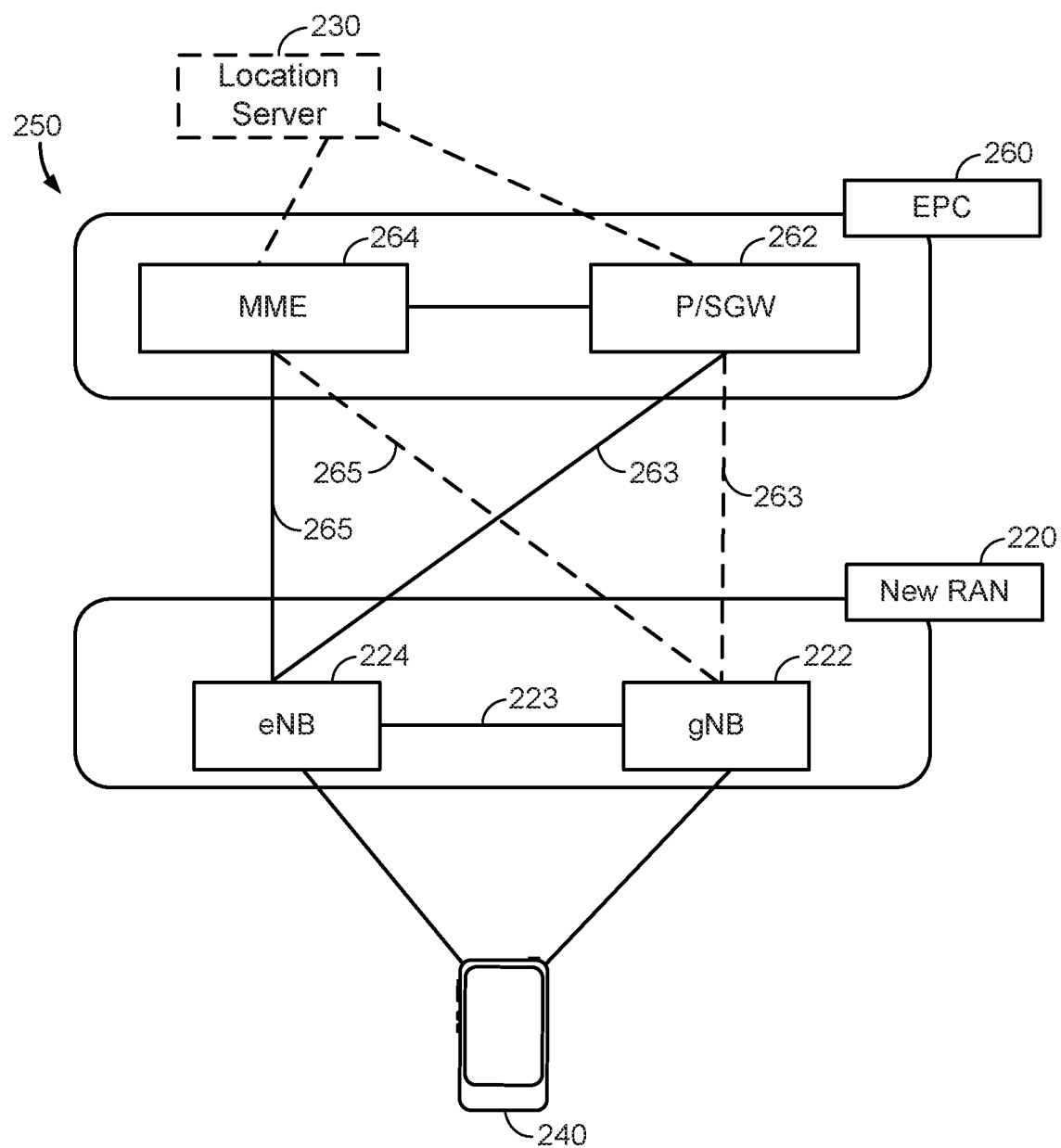

According to various aspects, FIG. 2B illustrates another example wireless network structure 250. For example, Evolved Packet Core (EPC) 260 can be viewed functionally as control plane functions, Mobility Management Entity (MME) 264 and user plane functions, Packet Data Network Gateway/Serving Gateway (P/SGW) 262, which operate cooperatively to form the core network. S1 user plane interface (S1-U) 263 and S1 control plane interface (S1-MME) 265 connect the eNB 224 to the EPC 260 and specifically to MME 264 and P/SGW 262. In an additional configuration, a gNB 222 may also be connected to the EPC 260 via S1-MME 265 to MME 264 and S1-U 263 to P/SGW 262. Further, eNB 224 may directly communicate to gNB 222 via the backhaul connection 223, with or without gNB direct connectivity to the EPC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include location server 230 which may be in communication with the EPC 260 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, EPC 260, and/or via the Internet (not illustrated).

Figure 3:
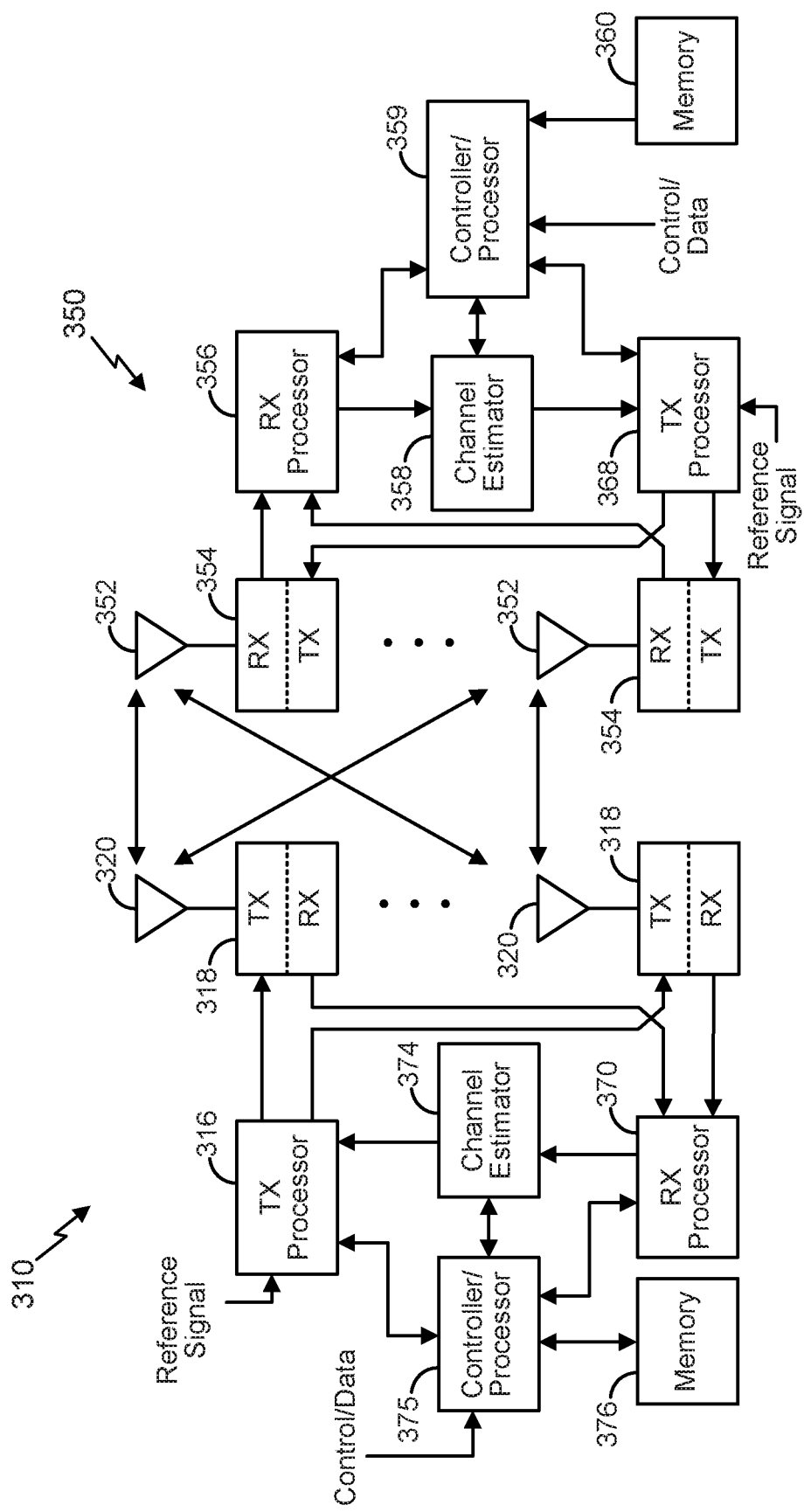
FIG. 3 illustrates an exemplary base station and an exemplary UE in an access network, according to various aspects of the disclosure.

According to various aspects, FIG. 3 illustrates an exemplary base station 310 (e.g., an eNB, a gNB, a small cell AP, a WLAN AP, etc.) in communication with an exemplary UE 350 in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318TX. Each transmitter 318TX may modulate an RF carrier with a respective spatial stream for transmission.

At the UE 350, each receiver RX 354 receives a signal through its respective antenna 352. Each receiver RX 354 recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by a channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters TX 354. Each transmitter TX 354 may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Figure 4A:
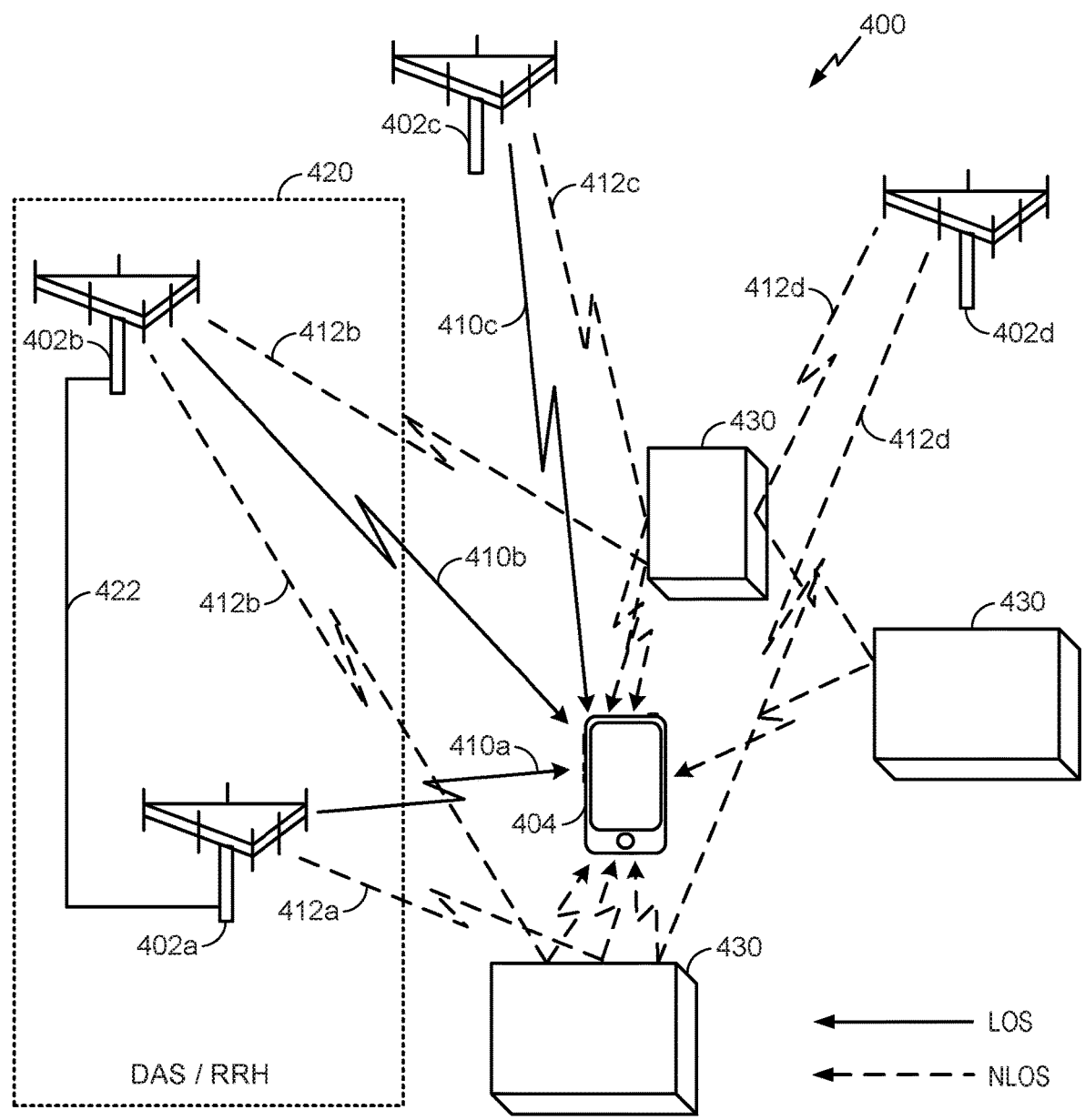
FIG. 4A illustrates an exemplary wireless communications system, according to various aspects of the disclosure.

FIG. 4A illustrates an exemplary wireless communications system 400 according to various aspects of the disclosure. In the example of FIG. 4A, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402a-d (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4A illustrates one UE 404 and four base stations 402, as will be appreciated, there may be more UEs 404 and more or fewer base stations 402.

To support position estimates, the base stations 402 may be configured to broadcast reference RF signals (e.g., Positioning Reference Signals (PRS), Cell-specific Reference Signals (CRS), Channel State Information Reference Signals (CSI-RS), synchronization signals, etc.) to UEs 404 in their coverage area to enable a UE 404 to measure reference RF signal timing differences (e.g., OTDOA or RSTD) between pairs of network nodes and/or to identify the beam that best excite the LOS or shortest radio path between the UE 404 and the transmitting base stations 402. Identifying the LOS/shortest path beam(s) is of interest not only because these beams can subsequently be used for OTDOA measurements between a pair of base stations 402, but also because identifying these beams can directly provide some positioning information based on the beam direction. Moreover, these beams can subsequently be used for other position estimation methods that require precise ToA, such as round-trip time estimation based methods.

As noted above, various downlink signals can be used to measure reference RF signal timing differences. However, some of these downlink signals may suffer from poor hearability in certain network configurations. Positioning Reference Signals (PRS) are configured specifically to allow the UE to perform timing (ranging) measurements of signals from multiple cells to improve OTDOA positioning performance. The PRS is delivered with pre-defined bandwidth and a set of configuration parameters such as subframe offset ($\Delta_{PRS}$), periodicity ($T_{PRS}$), duration ($N_{PRS}$), muting pattern, and muting sequence periodicity ($T_{REP}$). PRS can be transmitted in pre-defined positioning subframes grouped by several consecutive subframes $N_{PRS}$, which are termed "positioning occasions." Positioning occasions occur periodically with a certain periodicity $T_{PRS}$. The period $T_{PRS}$ can be 160, 320, 640, or 1280 subframes, and the number of consecutive subframes $N_{PRS}$ can be 1, 2, 4, or 6 subframes. The base stations can be configured for time based blanking, called "PRS muting." When the (strong) PRS signal is muted, the (weak) PRS signals from the neighbor cells are more easily detected by the UE. As noted above, the PRS muting configuration of a cell is defined by a periodic muting sequence with periodicity $T_{REP}$. The $T_{REP}$ is counted in number of PRS positioning occasions, and can be 2, 4, 8, or 16. In summary, isolation of PRS can provide improvement of OTDOA performance over the usage of other downlink signals. Further, an exhaustive discussion of PRS is not provided herein, as additional details are known in the art (see, e.g., 3GPP TS 36.211 entitled "Evolved Universal Terrestrial Radio Access (E-UTRA); Physical Channels and Modulation"). However, although PRS may provide advantages over other downlink RF signals, the various aspects disclosed herein are not limited to PRS.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230) may send assistance data to the UE 404 that includes an identification of one or more neighbor cells of base stations 402 and configuration information for reference RF signals transmitted by each neighbor cell. Alternatively, the assistance data can originate directly from the base stations 402 (e.g., in periodically broadcasted overhead messages, etc.). Alternatively, the UE 404 can detect neighbor cells of base stations 402 itself without the use of assistance data. The UE 404 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 402 or antenna(s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE 404, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402)

corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Thus, FIG. 4A illustrates an aspect in which base stations 402a and 402b form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

To accurately determine the position of the UE 404 using the OTDOAs and/or RSTDs between RF signals received from pairs of network nodes, the UE 404 needs to measure the reference RF signals received over the LOS path (or the shortest NLOS path where an LOS path is not available), between the UE 404 and a network node (e.g., base station 402, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 4A illustrates a number of LOS paths 410 and a number of NLOS paths 412 between the base stations 402 and the UE 404. Specifically, FIG. 4A illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over two NLOS paths 412d. As illustrated in FIG. 4A, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS paths 410 (e.g., the beams produce highest antenna gain along the LOS paths) while other available beams may focus the transmitted RF signal along the NLOS paths 412. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space from the transmitter to the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 402 uses beamforming to transmit RF signals, the beams of interest for data communication between the base station 402 and the UE 404 will be the beams carrying RF signals that arrive at UE 404 with the highest signal strength (as indicated by, e.g., the Received Signal Received Power (RSRP) or SINR in the presence of a directional interfering signal), whereas the beams of interest for position estimation will be the beams carrying RF signals that excite the shortest path or LOS path (e.g., an LOS path 410). In some frequency bands and for antenna systems typically used, these will be the same beams. However, in other frequency bands, such as mmW, where typically a large number of antenna elements can be used to create narrow transmit beams, they may not be the same beams. In some cases, the signal strength of RF signals on the LOS path 410 may be weaker (e.g., due to obstructions) than the signal strength of RF signals on an NLOS path 412, over which the RF signals arrive later due to propagation delay.

Figure 4B:
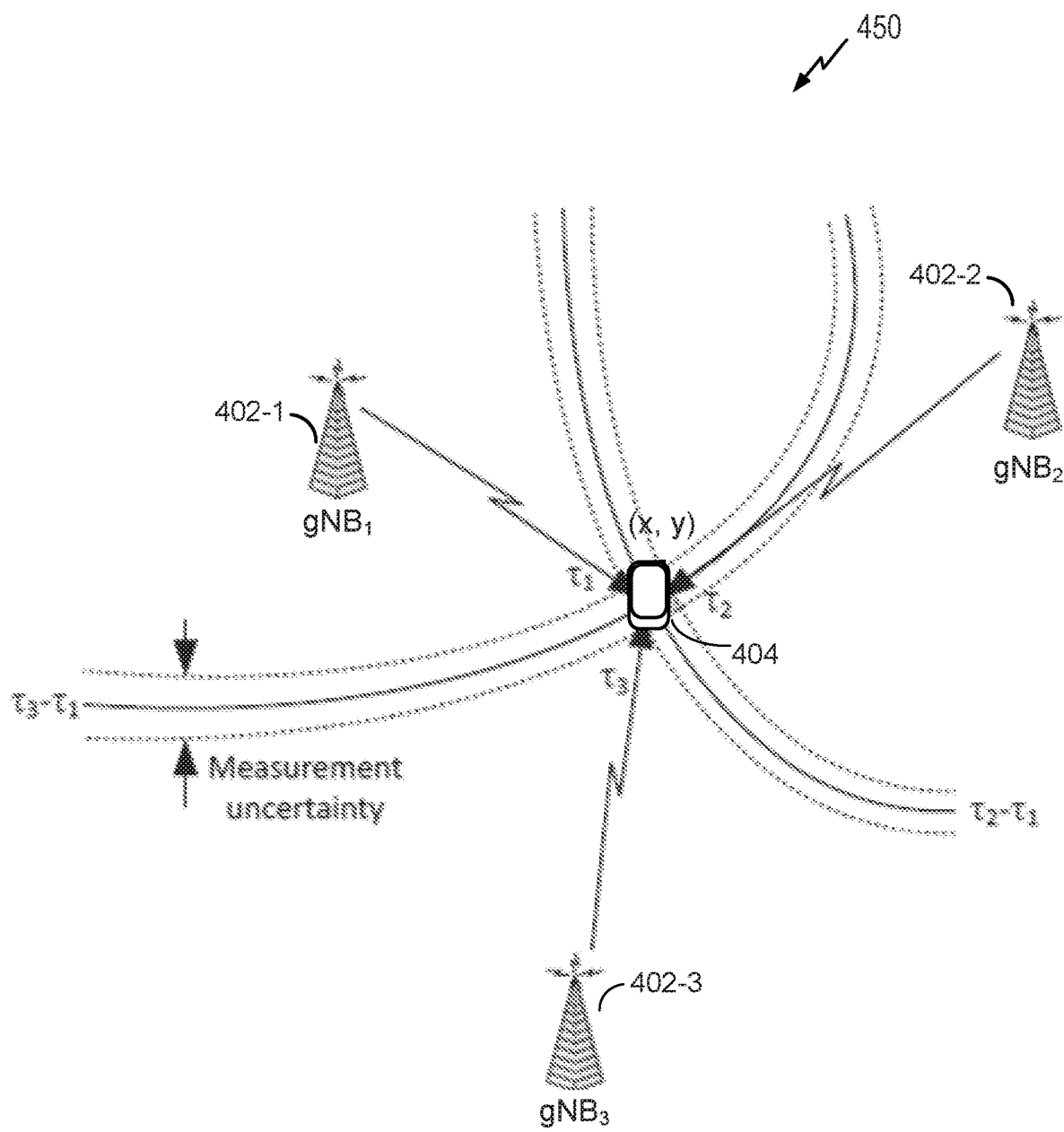
FIG. 4B illustrates another exemplary wireless communications system, according to various aspects of the disclosure.

FIG. 4B illustrates an exemplary wireless communications system 450 according to various aspects of the disclosure to further illustrate OTDOA measurements. In the example of FIG. 4B, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402-1, 402-2, and 402-3 (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 450 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4B illustrates one UE 404 and three base stations 402, as will be appreciated, there may be more UEs 404 and more or fewer base stations 402.

As discussed above, to support position estimates, the base stations 402 may be configured to broadcast reference RF signals to UEs 404 in their coverage area to enable a UE 404 to measure characteristics of such reference RF signals. For example, the Observed Time Difference of Arrival (OTDOA) positioning method, defined by the 3rd Generation Partnership Project (3GPP) (e.g., in 3GPP Technical Specification (TS) 36.355) for wireless networks that provide wireless access (e.g., using LTE, 5G NR, etc.), is a multilateration method in which the UE 404 measures the time difference, known as a Reference Signal Time Difference (RSTD), between specific reference RF signals (e.g., PRS, CRS, CSI-RS, etc.) transmitted by different pairs of network nodes (e.g., base stations 402, antennas of base stations 402, etc.) and either reports these time differences to a location server, such as the location server 230, or computes a location estimate itself from these time differences.

Generally, RSTDs are measured between a reference network node (e.g., base station 402-1 in the example of FIG. 4B) and one or more neighbor network nodes (e.g., base stations 402-2 and 402-3 in the example of FIG. 4B). The reference network node remains the same for all RSTDs measured by the UE 404 for any single positioning use of OTDOA and would typically correspond to the serving base station for the UE 404 or another nearby network node with good signal strength at the UE 404. In an aspect, where a measured network node is a cell supported by a base station, the neighbor network nodes would normally be cells supported by base stations different from the base station for the reference cell and may have good or poor signal strength at the UE 404. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., location server 230) may provide OTDOA assistance data to the UE 404 for the reference network node (e.g., base station 402-1 in the example of FIG. 4B) and the neighbor network nodes (e.g., base stations 402-2 and 402-3 in the example of FIG. 4B) relative to the reference network node. For example, the assistance data may provide the center channel frequency of each network node, various reference RF signal configuration parameters (e.g., the number of consecutive positioning subframes, periodicity of positioning subframes, muting sequence, frequency hopping sequence, reference RF signal ID, reference RF signal bandwidth), a network node global ID, and/or other cell related parameters applicable to OTDOA. The OTDOA assistance data may indicate the serving cell for the UE 404 as the reference network node.

In some cases, OTDOA assistance data may also include "expected RSTD" parameters, which provide the UE 104 with information about the RSTD values the UE 404 is expected to measure at its current location between the reference network node and each neighbor network node, together with an uncertainty of the expected RSTD parameter. The expected RSTD, together with the associated uncertainty, may define a search window for the UE 404 within which the UE 404 is expected to measure the RSTD value. OTDOA assistance information may also include reference RF signal configuration information parameters, which allow a UE 404 to determine when a reference RF signal positioning occasion occurs on signals received from various neighbor network nodes relative to reference RF signal positioning occasions for the reference network node, and to determine the reference RF signal sequence transmitted from various network nodes in order to measure a signal Time of Arrival (ToA) or RSTD.

In an aspect, while the location server (e.g., location server 230) may send the assistance data to the UE 404, alternatively, the assistance data can originate directly from the network nodes (e.g., base stations 402) themselves (e.g., in periodically broadcasted overhead messages, etc.). Alternatively, the UE 404 can detect neighbor network nodes itself without the use of assistance data.

The UE 404 (e.g., based in part on the assistance data, if provided) can measure and (optionally) report the RSTDs between reference RF signals received from pairs of network nodes. Using the RSTD measurements, the known absolute or relative transmission timing of each network node, and the known position(s) of the transmitting antennas for the reference and neighboring network nodes, the UE's 404 position may be calculated (e.g., by the UE 404, serving base station or by the location server 230). More particularly, the RSTD for a neighbor network node "k" relative to a reference network node "Ref" may be given as (ToA$_k$–ToA$_{Ref}$), where the ToA values may be measured modulo one subframe duration (1 ms) to remove the effects of measuring different subframes at different times. In the example of FIG. 4B, the measured time differences between the reference cell of base station 402-1 and the neighboring cells of base stations 402-2 and 402-3 are represented as $\tau_2-\tau_1$ and $\tau_3-\tau_1$, where $\tau_1$, $\tau_2$, and $\tau_3$ represent the ToA of a reference RF signal from the transmitting antenna(s) of base station 402-1, 402-2, and 402-3, respectively. The UE 404 may then convert the ToA measurements for different network nodes to RSTD measurements (e.g., as defined in 3GPP TS 36.214 entitled "Physical layer; Measurements") and (optionally) send them to the location server 230. Using (i) the RSTD measurements, (ii) the known absolute or relative transmission timing of each network node, (iii) the known position(s) of physical transmitting antennas for the reference and neighboring network nodes, and/or (iv) directional reference RF signal characteristics such as a direction of transmission, the UE's 404 position may be determined (either by the UE 404, serving base station or the location server 230).

When the UE 404 obtains a location estimate itself using OTDOA measured time differences, the necessary additional data (e.g., network nodes' locations and relative transmission timing) may be provided to the UE 404 by a location server (e.g., location server 230). In some implementations, a location estimate for the UE 404 may be obtained (e.g., by the UE 404 itself or by the location server 230) from OTDOA measured time differences and from other measurements made by the UE 404 (e.g., measurements of signal timing from GPS or other GNSS satellites). In these implementations, known as hybrid positioning, the OTDOA measurements may contribute towards obtaining the UE's 404 location estimate but may not wholly determine the location estimate.

Uplink Time Difference of Arrival (UTDOA) is a similar positioning method to OTDOA, but is based on uplink reference RF signals transmitted by the UE (e.g., UE 404). Further, transmission and/or reception beamforming at the network node and/or UE 404 can enable wideband bandwidth at the cell edge for increased precision. Beam refinements may also leverage channel reciprocity procedures in 5G NR.

Referring back to FIG. 4B, in order to identify the ToA of a reference RF signal transmitted by a given network node, the UE 404 first jointly processes all the resource elements (REs) on the channel on which that network node (e.g., base station 402) is transmitting the reference RF signal, and performs an inverse Fourier transform to convert the received RF signals to the time domain. The conversion of the received RF signals to the time domain is referred to as estimation of the Channel Energy Response (CER). The CER shows the peaks on the channel over time, and the earliest "significant" peak should therefore correspond to the ToA of the reference RF signal. Generally, a UE will use a noise-related quality threshold to filter out spurious local peaks, thereby presumably correctly identifying significant peaks on the channel. For example, a UE may chose a ToA estimate that is the earliest local maximum of the CER that is at least X dB higher than the median of the CER and a maximum Y dB lower than the main peak on the channel. The UE determines the CER for each reference RF signal from each network node in order to determine the ToA of each reference RF signal from the different network nodes.

According to various aspects, FIG. 5 illustrates an exemplary method for determining a timing resolution and a range of reported timing measurements used for position estimation. In particular, to support position estimation, two different network nodes 502a, 502b may be configured to broadcast or otherwise transmit reference RF signals or "positioning beacons" at blocks 510, 515, respectively. As such, a UE 504 may measure and report timing differences (e.g., OTDOA or RSTD) between the positioning beacons received from the different network nodes 502a, 502b, wherein each of the "network nodes" 502a, 502b may be a base station, a cell of a base station, a remote radio head, an antenna of a base station where the locations of the antennas of a base station are distinct from the location of the base station itself, or any other network entity that can suitably transmit reference RF signals. In various wireless networks such as those described in further detail above, physical layers may be highly configurable and the subcarrier spacing (e.g., Orthogonal Frequency-Division Multiplexing (OFDM) waveform) associated with the positioning beacons may vary. For example, in the wireless network structures 200, 250 shown in FIGS. 2A-2B, the subcarrier spacing of positioning beacons can vary from 15 KHz to 240 KHz and the positioning beacons can be transmitted over various bandwidths (e.g., from a few hundred KHz to a hundred MHz to multiple hundred MHz positioning beacons stitched together).

The accuracy of timing measurements (e.g., OTDOA or RSTD) that the UE 504 performs, which are in turn used to estimate position, may depend on these and/or other signal parameters associated with the positioning beacons. Accordingly, as described in further detail herein, the method illustrated in FIG. 5 may be used to determine the timing resolution (step size) and/or range of reported OTDOA values dependent on certain configuration(s) or signal parameters of the positioning beacons rather than using a fixed resolution and/or range for all different positioning beacon configurations.

Accordingly, referring to FIG. 5, the first network node 502a may transmit a positioning beacon 512 at block 510 and the second network node 502b may similarly transmit a positioning beacon 517 at block 515. For example, as mentioned above, the positioning beacons 512, 517 may comprise Positioning Reference Signals (PRS), Cell-specific Reference Signals (CRS), Channel State Information Reference Signal (CSI-RS), synchronization signals, or any other suitable downlink signals. Furthermore, in various embodiments, the first network node 502a and/or the second network node 502b may optionally transmit the positioning beacon(s) 512, 517 as sets of beams. These beams may be transmitted at different angles of departure (AoDs) and/or may have different beam shapes such as peak gain, sidelobe gain, and beam width. Furthermore, one or more of the beams may follow a shortest path (e.g., a LOS path or a shortest NLOS path) and one or more of the beams may follow longer (e.g., NLOS) paths to the UE 504. Referring to FIG. 5, at block 520, the UE 504 may receive the positioning beacon 512 from the first network node 502a, and the UE 504 may further receive the positioning beacon 517 from the second network node 502b at block 522. As will be apparent to those skilled in the art, the reception of the positioning beacon 512 from the first network node 502a and the positioning beacon 517 from the second network node 502b may be simultaneous or interleaved, instead of sequential as depicted in blocks 520 and 522. In cases where the positioning beacon(s) 512, 517 are transmitted as sets of beams, each RF signal may identify the beam transmitting it (e.g., by a beam index, by time of transmission, by transmitted sequence), and as such, the UE 504 may have the ability to match each RF signal in a cluster to the associated one of the beams.

According to various aspects, as mentioned above, the accuracy of OTDOA, RSTD, and/or other suitable timing measurements performed at the UE 504 may generally depend on various signal parameters associated with the positioning beacons 512, 517 that are received at block 520, 522. For example, a "timing resolution" may generally refer to a step size according to which a timing measurement is quantized for reporting (e.g., 32 nanoseconds (ns), 10 ns, etc., where 10 ns is a higher resolution than 32 ns). In various embodiments, the timing measurement may be quantized in a uniform manner (e.g., according to a fixed or linear step size) or the quantization may be non-uniform (e.g., non-linear). Furthermore, timing measurements may be quantized within a given "range" that spans between maximum and minimum reportable values (e.g., from −0.55 μs to +2.00 μs). As such, in one particular example, the range from −0.55 μs to +2.00 μs uniformly quantized with a 10 ns timing resolution results in possible quantized values of −0.55 μs, −0.54 μs, −0.53 μs, . . . , +1.98 μs, +1.99 μs, +2.00 μs (i.e., 256 total values that can be encoded using 8 bits). However, those skilled in the art will appreciate that the total number of possible quantized values, the size (in bits) of reported OTDOA values and/or the report containing the quantized values, and/or other suitable parameters of the reported timing measurements may also depend on the signal parameters associated with the positioning beacons 512, 517 (e.g., in the above example, a 20 ns timing resolution could be chosen, which would result in 128 possible values that can be encoded using 7 bits).

As such, because the accuracy of OTDOA, RSTD, and/or other suitable timing measurements may depend on certain transmission parameters of the positioning beacons 512, 517, the UE 504 may be configured to determine one or more signal parameters associated with each of the positioning beacons 512, 517 at block 530 such that the timing resolution (step size) and range of reported OTDOA values may depend on the determined signal parameters. For example, the timing resolution of a detected time of arrival (e.g., a first detected channel tap) may increase proportionally with the bandwidth of the positioning beacon(s) 512, 517. Similarly, the timing resolution and/or range of OTDOA measurements may depend on subcarrier spacing or resource mapping/density of occupied subcarriers in a frequency domain. For example, the range may generally become smaller with increasing subcarrier spacing (e.g., the range may be larger when every subcarrier is occupied compared to the range when every sixth subcarrier is occupied and remaining subcarriers are muted). In cases where the positioning beacons 512, 517 have different signal parameters (e.g., different bandwidths), the timing resolution and/or range may be determined based on a joint set of signal parameters. For example, in various embodiments, the determined value(s) may be based on the more limiting parameter set (e.g., because a smaller bandwidth results in decreased accuracy when determining time-of-arrival, the step size or timing resolution may be limited according to the smaller of the two bandwidths). In one possible variant, the determined value(s) may be an intermediate value between the value associated with the more limiting parameter set and the value associated with the less limiting parameter set. In another possible variant, one of the positioning beacons 512, 517 may be used as a reference beacon such that the signal parameters associated with the reference beacon are used to determine the timing resolution and range. In such embodiments, a base station may explicitly indicate to the UE 504 the one of the positioning beacons 512, 517 to be used as the reference beacon, or the one of the positioning beacons 512, 517 to be used as the reference beacon may always be the positioning beacon transmitted by a serving cell.

Accordingly, in various embodiments, the one or more signal parameters that are determined at block 530 may comprise a bandwidth of the positioning beacon(s) 512, 517, a resource mapping/density of occupied subcarriers (e.g., subcarrier spacing) in a frequency domain, a carrier bandwidth associated with the cell (or bandwidth-part) in which the positioning beacon(s) 512, 517 are received, a subcarrier spacing of the waveform of the positioning beacon(s) 512, 517, and/or a subcarrier spacing associated with the cell(s) in which the positioning beacon(s) 512, 517 are received, a subcarrier spacing of the waveform of the positioning beacon(s) 512, 517, a subcarrier spacing associated with the cell (or bandwidth-part) in which the positioning beacon(s) 512, 517 are received, a carrier frequency of the positioning beacon(s) 512, 517, and/or other suitable parameters. In various embodiments, at block 540, the UE 504 may then measure an OTDOA value between the positioning beacons received from the first network node 502*a* and the second network node 502*b* and quantize the measured OTDOA value according to a timing resolution and a range that depend on one or more of the signal parameters determined at block 530. In various embodiments, at block 550, the UE 504 may generate a report that contains the quantized OTDOA value and transmit the report to an appropriate network node (e.g., a location server) for use in estimating or otherwise determining the position of the UE 504. More particularly, the report may sent to a serving base station associated with the UE 504 via a wireless transmission, wherein the serving base station may generally correspond to one of the two network nodes 502*a*, 502*b* that transmitted the positioning beacon(s) 512, 517. However, as noted above, the two network nodes 502*a*, 502*b* may potentially be two distant transmission points that belong to the same base station, in which case both network nodes 502*a*, 502*b* could be the serving base station. The serving base station may then appropriately route the report to a location server for use in OTDOA-based positioning as described in further detail above.

Figure 6:
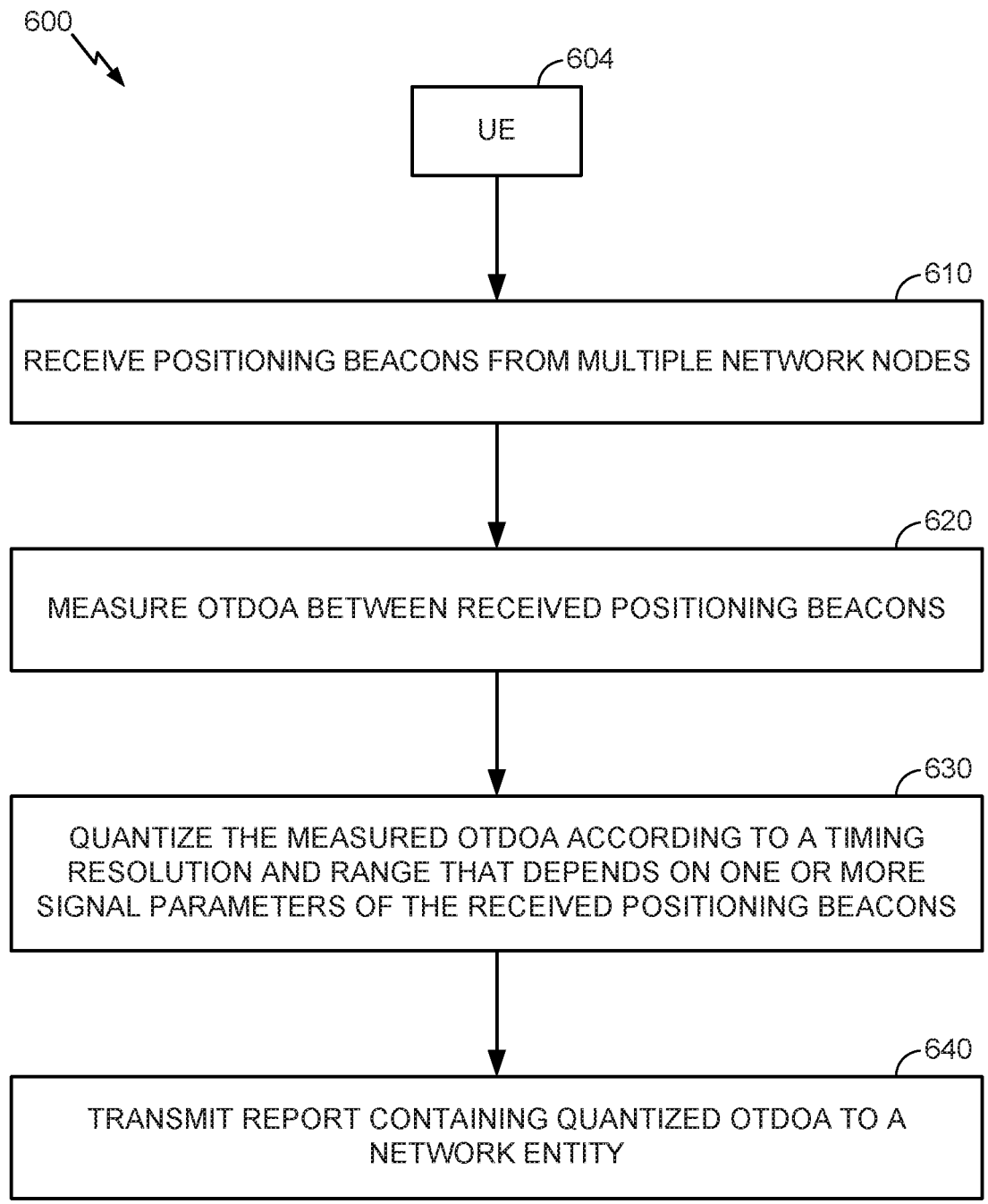

According to various aspects, FIG. 6 illustrates an exemplary method 600 for determining a timing resolution and range of reported timing measurements. The method 600 may be performed by a user equipment (UE) 604, such as the UE 350 having the structural configuration shown in FIG. 3 and/or any other suitable UE that may be described or otherwise contemplated herein. At block 610, the UE 604 may receive positioning beacons from multiple network nodes, wherein the received positioning beacons include at least a first positioning beacon received from a first network node and a second positioning beacon received from a second network node (e.g., two different base stations, two distant transmission points that belong to the same base station, or the same base station and same transmission point but be different beams). At block 620, the UE 604 may measure an observed time difference of arrival (OTDOA) between the first positioning beacon and the second positioning beacon, which may be quantized at block 630 according to a timing resolution and a range that depend at least in part on one or more signal parameters associated with the received positioning beacons. At block 640, the UE 604 may then transmit a report containing the quantized OTDOA to a network entity (e.g., a serving base station or location server). The serving base station may correspond to one or more of the network nodes from which the positioning beacons were received and may use the report in estimating or otherwise determining the position of the UE 604. In other aspects, the serving base station may receive and then transmit the report containing the quantized OTDOA to a location server for use in estimating or otherwise determining the position of the UE 604. Alternatively, the network entity may be the location server in communication with the UE 604 and which may receive the report containing the quantized OTDOA via communication path other than the serving base station (e.g., other base station, small cell AP, WLAN AP, etc.). For simplicity, the various aspects discussed herein will generally be described in relation to UE 604 transmitting the report to a serving base station. Additionally, it will be appreciated that at least some aspects disclosed advantageously allow for the timing resolution (e.g., step size) and/or the range of the reported OTDOA values to depend on certain configurations of the beacon signal, rather than using the same fixed resolution and/or range for all different configurations.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In view of the foregoing, it will be appreciated that various aspects disclosed herein may include various means for performing the functionalities, processes and/or steps described herein. It will be appreciated that the means for performing these aspects may be any of the elements, devices, components and/or structures disclosed herein and/or equivalents. Further, it will be appreciated that various design choices may allowed one skilled in the art to combine the functionalities into one element or distribute the functionalities between multiple elements. Further, the same element may be used for multiple means, either solely or in combination with other disclosed elements. For example, the UE 350 may include one or more processing systems (e.g., RX processor 356, etc.) and memory 360, as discussed in the foregoing, which may be used with the receiver(s) RX 354 and/or transmitter(s) TX 354 to perform one or more functions and which may be used alone or in combination with other elements to perform other functions.

Accordingly, the various aspects may include an apparatus including means for receiving positioning beacons from multiple network nodes. The received positioning beacons may include at least a first positioning beacon received from a first network node and a second positioning beacon received from a second network node. The apparatus may further include means for measuring an OTDOA between the first positioning beacon and the second positioning beacon. The apparatus may further include means for quantizing the measured OTDOA according to a timing resolution and/or a range that depend at least in part on one or more signal parameters associated with the received positioning beacons. The apparatus may further include means for transmitting a report containing the quantized OTDOA to a serving base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for determining a timing resolution and range of reported timing measurements, comprising:
    receiving positioning beacons from multiple network nodes at a user equipment (UE), wherein the received positioning beacons include at least a first positioning beacon received from a first network node and a second positioning beacon received from a second network node;
    measuring an observed time difference of arrival (OTDOA) between the first positioning beacon and the second positioning beacon;
    determining one or more parameters associated with the first positioning beacon and the second positioning beacon;
    determining, subsequent to receiving the first and second positioning beacons, a timing resolution and a range for quantization of the measured OTDOA based on the one or more parameters associated with the first positioning beacon and the second positioning beacon;
    quantizing, subsequent to determining the timing resolution and the range, the measured OTDOA according to the timing resolution and the range to generate a corresponding quantized OTDOA value that is encoded using a corresponding number of bits based on the timing resolution and the range; and
    transmitting a report containing the quantized OTDOA to a network entity.

2. The method recited in claim 1, wherein the timing resolution comprises a step size between consecutive reportable OTDOA values.

3. The method recited in claim 1, wherein the range comprises a span between a maximum reportable OTDOA value and a minimum reportable OTDOA value.

4. The method recited in claim 1, wherein the one or more signal parameters comprise a positioning beacon bandwidth, and wherein the timing resolution increases proportionally with the positioning beacon bandwidth.

5. The method recited in claim 4, wherein the one or more signal parameters further comprise a resource mapping or density of occupied subcarriers in a frequency domain, and wherein the range shrinks with increasing spacing between subcarriers.

6. The method recited in claim 1, wherein the one or more signal parameters comprise a carrier bandwidth associated with a cell or bandwidth-part in which one or more of the first positioning beacon or the second positioning beacon are received.

7. The method recited in claim 1, wherein the one or more signal parameters comprise a subcarrier spacing of a waveform associated with one or more of the first positioning beacon or the second positioning beacon.

8. The method recited in claim 1, wherein the one or more signal parameters comprise a subcarrier spacing associated with a cell or bandwidth-part in which one or more of the first positioning beacon or the second positioning beacon are received.

9. The method recited in claim 1, wherein the first network node and the second network node comprise two different base stations.

10. The method recited in claim 1, wherein the first network node and the second network node are the same base station.

11. The method recited in claim 10, wherein the first network node and the second network node comprise two transmission points belonging to the same base station.

12. The method recited in claim 1, wherein the positioning beacons comprise one or more of Positioning Reference Signals (PRS), Cell-specific Reference Signals (CRS), Channel State Information Reference Signals (CSI-RS), or synchronization signals.

13. The method recited in claim 1, wherein the network entity is a serving base station that corresponds to one or more of the multiple network nodes from which the positioning beacons were received.

14. The method recited in claim 1, wherein the network entity is a location server in communication with the UE.

15. The method of claim 1, wherein, if the at least the first positioning beacon and the second positioning beacon have different associated signal parameters, the timing resolution and the range are determined based on a joint set of signal parameters.

16. An apparatus, comprising:
a receiver configured to receive positioning beacons from multiple network nodes, wherein the received positioning beacons include at least a first positioning beacon received from a first network node and a second positioning beacon received from a second network node;
one or more processors configured to:
measure an observed time difference of arrival (OTDOA) between the first positioning beacon and the second positioning beacon;
determine one or more parameters associated with the first positioning beacon and the second positioning beacon;
determine, subsequent to receiving the first and second positioning beacons, a timing resolution and a range for quantization of the measured OTDOA based on the one or more parameters associated with the first positioning beacon and the second positioning beacon; and
quantize, subsequent to determining the timing resolution and the range, the measured OTDOA according to the timing resolution and the range to generate a corresponding quantized OTDOA value that is encoded using a corresponding number of bits based on the timing resolution and the range; and
a transmitter configured to transmit a report containing the quantized OTDOA to a network entity.

17. The apparatus recited in claim 16, wherein the timing resolution comprises a step size between consecutive reportable OTDOA values.

18. The apparatus recited in claim 16, wherein the range comprises a span between a maximum reportable OTDOA value and a minimum reportable OTDOA value.

19. The apparatus recited in claim 16, wherein the one or more signal parameters comprise a positioning beacon bandwidth, and wherein the timing resolution increases proportionally with the positioning beacon bandwidth.

20. The apparatus recited in claim 19, wherein the one or more signal parameters further comprise a resource mapping or density of occupied subcarriers in a frequency domain, and wherein the range shrinks with increasing spacing between subcarriers.

21. The apparatus recited in claim 16, wherein the one or more signal parameters comprise a carrier bandwidth associated with a cell or bandwidth-part in which one or more of the first positioning beacon or the second positioning beacon are received.

22. The apparatus recited in claim 16, wherein the one or more signal parameters comprise a subcarrier spacing of a waveform associated with one or more of the first positioning beacon or the second positioning beacon.

23. The apparatus recited in claim 16, wherein the one or more signal parameters comprise a subcarrier spacing associated with a cell or bandwidth-part in which one or more of the first positioning beacon or the second positioning beacon are received.

24. The apparatus recited in claim 16, wherein the first network node and the second network node comprise two different base stations.

25. The apparatus recited in claim 16, wherein the first network node and the second network node are the same base station.

26. The apparatus recited in claim 25, wherein the first network node and the second network node comprise two transmission points belonging to the same base station.

27. The apparatus recited in claim 16, wherein the positioning beacons comprise one or more of Positioning Reference Signals (PRS), Cell-specific Reference Signals (CRS), Channel State Information Reference Signals (CSI-RS), or synchronization signals.

28. The apparatus recited in claim 16, wherein the network entity is a serving base station that corresponds to one or more of the multiple network nodes from which the positioning beacons were received.

29. An apparatus, comprising:
means for receiving positioning beacons from multiple network nodes at a user equipment (UE), wherein the received positioning beacons include at least a first positioning beacon received from a first network node and a second positioning beacon received from a second network node;
means for measuring an observed time difference of arrival (OTDOA) between the first positioning beacon and the second positioning beacon;
means for determining one or more parameters associated with the first positioning beacon and the second positioning beacon;
means for determining, subsequent to receiving the first and second positioning beacons, a timing resolution and a range for quantization of the measured OTDOA based on the one or more parameters associated with the first positioning beacon and the second positioning beacon;

means for quantizing, subsequent to determining the timing resolution and the range, the measured OTDOA according to the timing resolution and the range to generate a corresponding quantized OTDOA value that is encoded using a corresponding number of bits based on the timing resolution and the range; and means for transmitting a report containing the quantized OTDOA to a network entity.

30. A non-transitory computer-readable storage medium having computer-executable instructions recorded thereon, the computer-executable instructions configured to cause a device having one or more processors to:

receive positioning beacons from multiple network nodes at a user equipment (UE), wherein the received positioning beacons include at least a first positioning beacon received from a first network node and a second positioning beacon received from a second network node;

measure an observed time difference of arrival (OTDOA) between the first positioning beacon and the second positioning beacon;

determine one or more parameters associated with the first positioning beacon and the second positioning beacon;

determine, subsequent to receiving the first and second positioning beacons, a timing resolution and a range for quantization of the measured OTDOA based on the one or more parameters associated with the first positioning beacon and the second positioning beacon;

quantize, subsequent to determining the timing resolution and the range, the measured OTDOA according to the timing resolution and the range to generate a corresponding quantized OTDOA value that is encoded using a corresponding number of bits based on the timing resolution and the range; and transmit a report containing the quantized OTDOA to a network entity.

* * * * *